United States Patent [19]

Hirakawa

[11] Patent Number: 5,308,573
[45] Date of Patent: May 3, 1994

[54] METHOD OF MOLDING A FUEL TANK HAVING BAFFLE PLATES

[75] Inventor: Sadamu Hirakawa, Ichihara, Japan

[73] Assignee: Mitsui Petrochemical Industries, Ltd., Tokyo, Japan

[21] Appl. No.: 917,106

[22] PCT Filed: Dec. 5, 1991

[86] PCT No.: PCT/JP91/01694
   § 371 Date: Aug. 5, 1992
   § 102(e) Date: Aug. 5, 1992

[87] PCT Pub. No.: WO92/10354
   PCT Pub. Date: Jun. 25, 1992

[30] Foreign Application Priority Data
   Dec. 6, 1990 [JP] Japan ................... 2-400622

[51] Int. Cl.⁵ .............................................. B29C 49/20
[52] U.S. Cl. .................................. 264/516; 425/503; 425/525; 425/535
[58] Field of Search ............... 264/516, 515; 425/525, 425/535, 503

[56] References Cited

U.S. PATENT DOCUMENTS 3,919,373  11/1975  Kormendi ........................... 264/516

FOREIGN PATENT DOCUMENTS 1930948  12/1970  Fed. Rep. of Germany.
55-021207  2/1980  Japan ................... 264/516
55-079121  6/1980  Japan ................... 264/516
105539  8/1980  Japan.

*Primary Examiner*—Catherine Timm
*Attorney, Agent, or Firm*—Sherman and Shalloway

[57] ABSTRACT

A method of molding a fuel tank wherein two baffle plates mounted on a blow-in are inserted in a molten parison of a thermoplastic resin surrounded by a split metal mold. The split metal mold is closed around the parison and a pressurized fluid is fed through the blow-in into the molten parison to blow-mold the fuel tank. The baffle plates, during the blow-molding, are melt-adhered onto the inner wall of the fuel tank. A blow-molded fuel tank containing two baffle plates adhered to the inner wall of the fuel tank is obtained.

7 Claims, 4 Drawing Sheets

METHOD OF MOLDING A FUEL TANK HAVING BAFFLE PLATES

INDUSTRIAL FIELD OF UTILIZATION

The present invention relates to a method of molding a fuel tank having baffle plates and, more specifically, to a method of molding a fuel tank by the blow-molding method and, at the same time, mounting baffle plates on the inner surface of the fuel tank as a unitary structure.

PRIOR ART

Plastic fuel tanks such as automotive fuel tanks have been provided with baffle plates on the inside thereof in order to improve mechanical strength, and to prevent unpleasant sound that is generated when the fuel pitches and rolls in the tank while the vehicle is running and to stabilize the internal capacity of the tank.

A conventional method of molding a fuel tank with baffle plates consists of using a metal mold having convex portions that correspond to the plates, and effecting the blow-molding while arranging in the metal mold the parison that is formed by extrusion-molding or injection-molding a thermoplastic resin.

According to the above method, however, the root portions of the baffle plates tend to lose thickness, limitation is imposed on the size of the baffle plates, and technological difficulty is involved in molding two pieces of baffle plates simultaneously.

GIST OF THE INVENTION

The object of the present invention therefore is to provide a method of molding a fuel tank having baffle plates, which effectively solves the above-mentioned problems inherent in the prior art.

According to the present invention, there is provided a method of molding a fuel tank comprising inserting a blow-pin in a molten parison of a thermoplastic resin from the lower side thereof, said blow-pin having a plurality of grooves formed therein downwardly extending from the tip of said blow-pin and having different lengths relative to each other, mounting a plurality of pre-molded baffle plates on said blow-pin via the plurality of grooves, closing the split metal molds under this condition, feeding a pressurized fluid thereto, and melt-adhering the baffle plates onto the inner surface of the fuel tank while said fuel tank is being molded.

This is, according to the present invention, it is allowed to provide a plurality of, for example, two pieces of baffle plates in the fuel tank simultaneously with the molding of the fuel tank without resulting in the formation of very thin portions.

PREFERRED EMBODIMENTS OF THE INVENTION

In the present invention, examples of the resin material for making baffle plates and fuel tank include any thermosetting resins that can be blow-molded such as polyolefin resins, e.g., low-, medium- and high-density polyethylenes, a polypropylene, an ethylene-$\alpha$-olefin copolymer, a thermoplastic polyester, a polyamide resin, etc. Among them, a polyolefin resin is preferably used. Moreover, the thermoplastic resins must exhibit not only resistance against environmentally caused stress and cracks (ESCR property) for light oils that are now chiefly used as fuels and methanol that has been studied to be used as a fuel in the future, but also gas barrier property, impact resistance, heat resistance and weatherability. Among the polyolefin resins, the high-density polyethylene is preferably used from the standpoint of such properties. As the baffle plates, in particular, there can be preferably used the high-density polyethylene having a melt flow rate (MFR) of 0.01 to 10 g/10 min. and particularly 0.1 to 10 g/min. under the load of 2160 g and a density of 0.94 to 0.97 g/cm$^3$. As the fuel tank, there can be preferably used the high-density polyethylene having an MFR of 1.0 to 10 g/10 min. and particularly 2 to 5 g/10 min. under the load of 21.6 kg, and a density of 0.94 to 0.97 g/cm$^3$.

The invention will now be described based on embodiments shown in the accompanying drawings.

Figure 1:
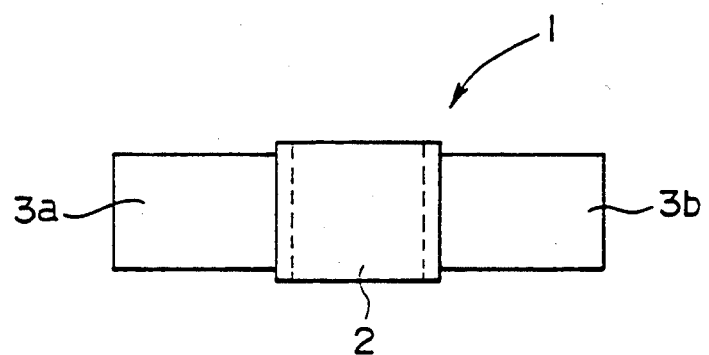
FIG. 1 is a side sectional view of a baffle plate molded article used in the present invention.
Figure 2:
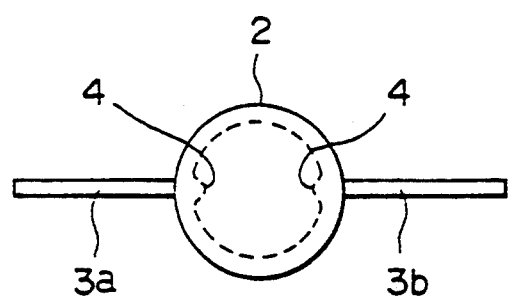
FIG. 2 is a plan view of the baffle plate molded article used in the present invention.
Figure 3:
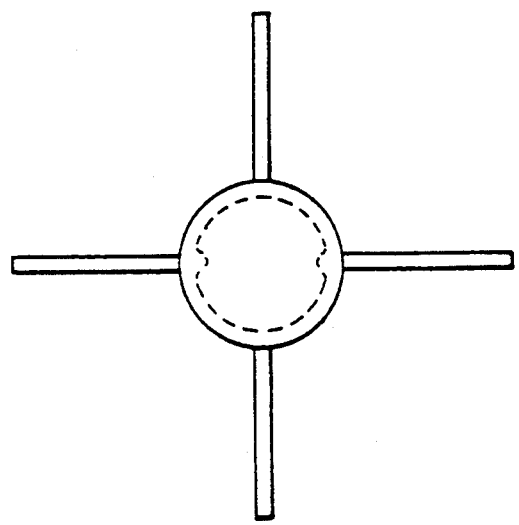
FIG. 3 is a diagram illustrating another baffle plate molded article used in the present invention.

According to the method of the present invention, the baffle plates are first molded before being melt-adhered to the interior of the fuel tank. FIG. 1 is a side sectional view of the baffle plates and FIG. 2 is a plan view thereof. As will be obvious from FIGS. 1 and 2, the baffle plates (generally designated at 1) consist of a hollow tubular support portion 2 and a pair of plate portions 3a and 3b that outwardly extend in the direction of diameter thereof. The tubular support portion 2 has protuberances 4,4 formed on the inner surface thereof, so that it can be mounted on a blow-pin that will be described later. In FIGS. 1 and 2, the plates are provided in a pair. The plates, however, may be provided in two or more pairs as shown in FIG. 3.

The baffle plates can be easily molded by a molding method which is known per se, such as extrusion molding, injection molding or a like method.

Figure 4:
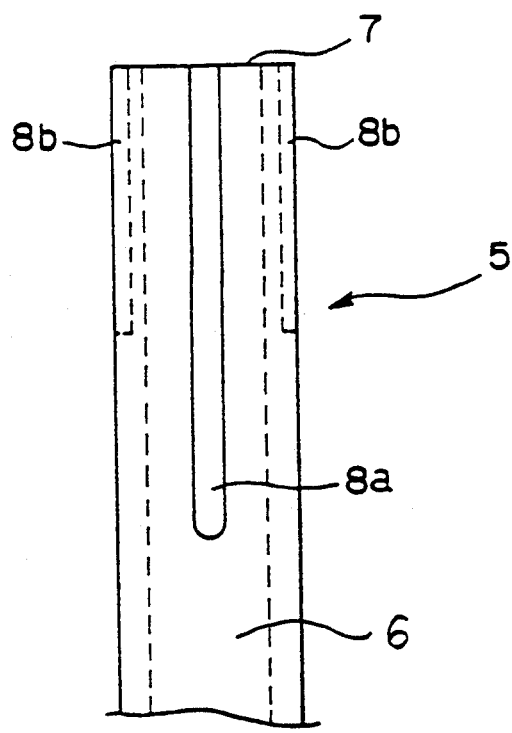
FIG. 4 is a side sectional view illustrating a blow-pin used in the present invention.
Figure 5:
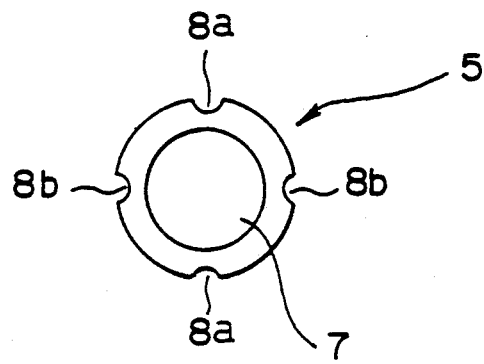
FIG. 5 is a plan view of the blow-pin that is used in the present invention.

According to the present invention, the baffle plates are mounted on the blow-pin. Here, it is desired that the baffle plates are pre-heated in an oven maintained at about 100° C. for about 15 minutes. FIG. 4 is a side sectional view of the blow-pin and FIG. 5 is a plan view thereof. That is, the blow-pin (generally designated at 5) has a pressurized fluid feeding portion 6 formed on the inside thereof and further has an opening 7 formed at the upper end thereof. The pressurized fluid such as the air is released to the external side through the opening 7, and whereby the so-called blow molding is carried out.

Furthermore, long grooves 8a and short grooves 8b are alternatingly formed on the outer surface of the blow-pin 5 downwardly extending from the upper end thereof. The blow-pin 5 is inserted in the tubular support portion 2 of the baffle plates 1, whereby the protuberances 4 engage with the grooves, and the two pieces of baffle plates 1 are mounted on the blow-pin 5.

That is, the two pieces of baffle plates are held by the long grooves 8a and short grooves 8b, respectively (the baffle plate held by the long grooves 8a is located at a lower portion of the blow-pin 5 and the baffle plate held by the short grooves 8b is located at an upper portion of the blow-pin 5).

According to the present invention, the fuel tank is molded by the blow-molding by using the blow-pin 5 on which are mounted two pieces of baffle plates 1.

Figure 6:
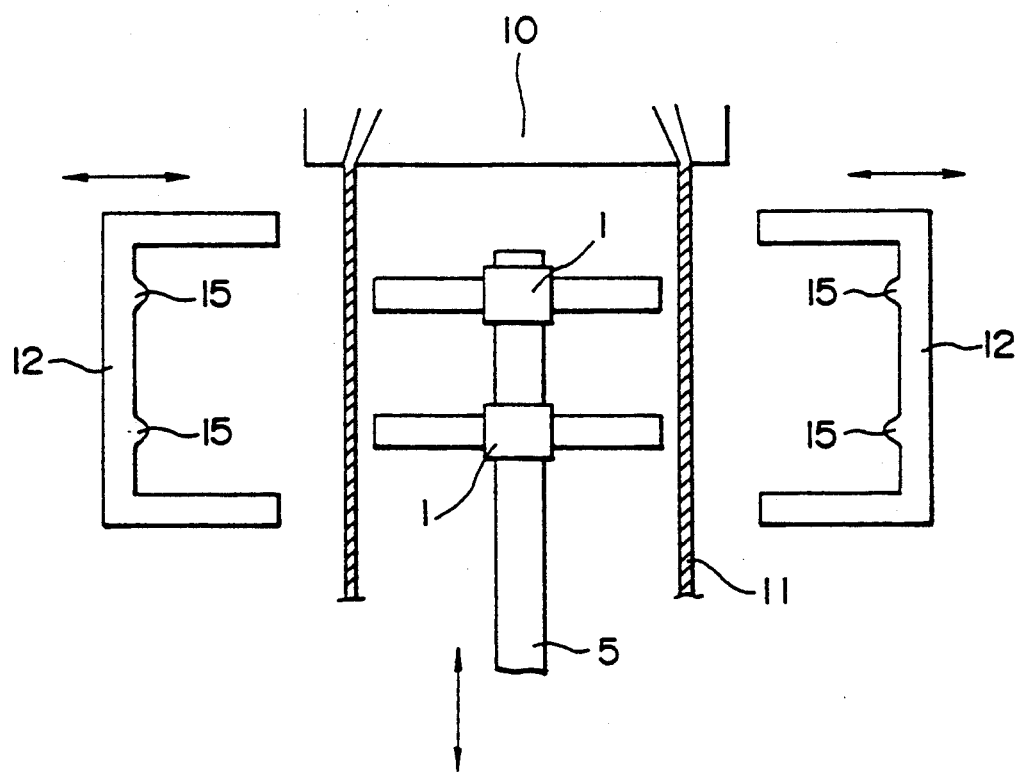
FIG. 6 is a diagram showing the step of blow-molding according to the present invention.

This step is shown in FIG. 6.

That is, in FIG. 6, a hollow tubular molten parison 11 (parison resin temperature is 200° to 240° C.) is extruded from an extruder 10, and the blow-pin 5 on which the baffle plates 1 are mounted is inserted in the molten parison 11. Split metal molds 12, 12 are arranged on the outside of the molten parison 11, and are closed under the condition where the blow-pin 5 is fitted in the molten parison 11. The pressurized fluid such as the air is blown through the blow-pin 5 in order to mold the fuel tank and, at the same time, to melt-adhere the baffle plates 1 onto the inner wall of the tank.

Figure 7:
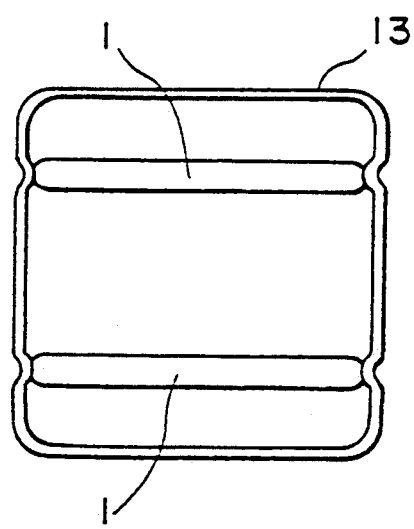
FIG. 7 is a diagram showing a fuel tank produced according to the present invention.

After the molding is finished, the blow-pin 5 is pulled out thereby to obtain a fuel tank 13 having baffle plates 1 as shown in FIG. 7.

In the above-mentioned step, it is desired that tiny protuberances 15 are formed on the surfaces of the split metal molds 12 that come in contact with the baffle plates 1. The protuberances enable the baffle plates 1 to be effectively melt-adhered.

In the above-mentioned step, the fuel tank was produced having two pieces of baffle plates. It is, of course, allowable to produce the fuel tank having more baffle plates, such as three or more pieces of baffle plates. In this case, the number of grooves formed in the blow-pin should be increased depending upon the number of the baffle plates.

In accordance with the present invention mentioned above, there was produced a fuel tank having a content of 100 liters, a weight of 7.5 kg and two baffle plates (0.6 kg) by using the resin described below and a blow-molding machine manufactured by Nippon Seikosho Co. "NB60P115AC25" (mold fastening force 60 tons, screw diameter 115 mm, accumulator 25L).

RESIN USED

Main Body

A high-density polyethylene having an MFR (load 21.6 kg) of 4 g/10 min., and a density of 0.956 g/cm$^3$.

Baffle Plates

A high-density polyethylene having an MFR (load 2160 g) of 5.5 g/10 min., and a density of 0.968 g/cm$^3$.

The thus obtained fuel tank possessed a minimum thickness of greater than 3 mm with no extremely thin portions, and was strong enough.

According to the present invention, the metal mold used for the molding operation needs not be provided with protuberances that correspond to the baffle plates. It is therefore allowed to obtain a fuel tank which as a whole has a uniform thickness without extremely thin portions and to provide two pieces of baffle plates inside the fuel tank while it is being molded, contributing to greatly enhancing the operation efficiency.

What is claimed is:

1. A method of blow-molding a fuel tank comprising the steps of:
   providing pre-molded baffle plates having a hollow tubular portion including an inner surface and plate portions extending outwardly from said tubular portion and the inner surface of said tubular portion having protuberances, and
   providing a blow-pin having a tip and an outer surface including a plurality of grooves in said outer surface extending downwardly from said tip,
   mounting a plurality of said pre-molded baffle plates on said blow-pin by having the protuberances on the baffle plates engage the grooves in the blow-pin;
   inserting said blow-pin with the baffle plates in a molten parison of a thermoplastic resin; and
   closing a split metal mold from outside of the molten parison at the time of feeding a pressurized fluid into the mold via the blow-pin so that the baffle plates melt-adhere onto an inner surface of the fuel tank to be molded.

2. A molding method according to claim 1 wherein said blow-pin has a plurality of grooves of alternating different lengths, relative to each other, extending downwardly from the tip of said blow-pin.

3. A molding method according to claim 1, wherein said thermoplastic resin is a high-density polyethylene having an MFR of from 1.0 to 10 g/10 min. under the load of 21.6 kg, and a density of 0.94 to 0.97 g/cm$^3$.

4. A molding method according to claim 1, wherein said baffle plates are made of a high-density polyethylene having an MFR of 0.01 to 10 g/min. under the load of 2160 g, and a density of 0.94 to 0.97 g/cm$^3$.

5. A method for blow-molding the main body of a fuel tank containing baffle plates which comprises the steps of:
   providing pre-molded baffle plates having a hollow tubular portion including an inner surface and plate portions extending outwardly from said tubular portion and the inner surface of said tubular portion having protuberances, and
   providing a blow-pin having a tip and an outer surface including a plurality of grooves in said outer surface of alternating different lengths relative to each other extending downwardly from said tip,
   mounting a plurality of said pre-molded baffle plates on said blow-pin by having the protuberances on the baffle plates engage the grooves in the blow-pin,
   inserting said blow-pin with the baffle plates mounted thereon into a molten parison of a thermoplastic resin which is surrounded by a split fuel tank metal mold, having an opening for the blow-pin,
   closing the split mold,
   feeding a pressurized fluid through the blow-pin into the molten parison to blow-mold the molten parison and to melt-adhere the end portions of the baffle plates onto the inner surface of the fuel tank.

6. A molding method according to claim 5, wherein said main body is made from a high-density polyethylene thermoplastic resin having an MFR of from 1.0 to 10 g/10 min. under the load of 21.6 kg, and a density of 0.94 to 0.97 g/cm$^3$.

7. A molding method according to claim 5, wherein said baffle plates are made from a high-density polyethylene thermoplastic resin having an MFR of 0.01 to 10 g/min under the load of 2160 g and a density of 0.94 to 0.97 g/cm$^3$.

* * * * *